T. C. DAVIDSON.
CULINARY VESSEL.
APPLICATION FILED OCT. 14, 1921.
1,418,432.
Patented June 6, 1922.
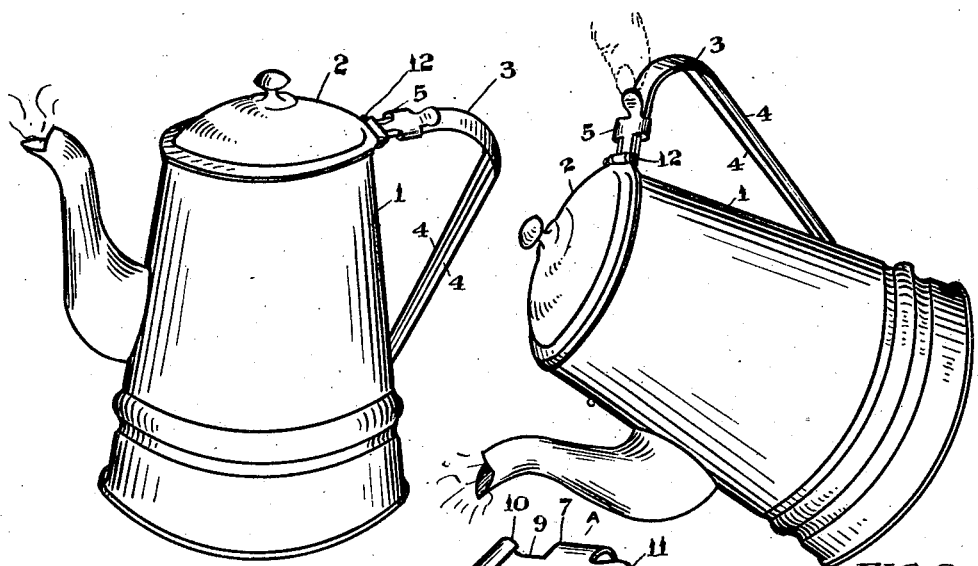
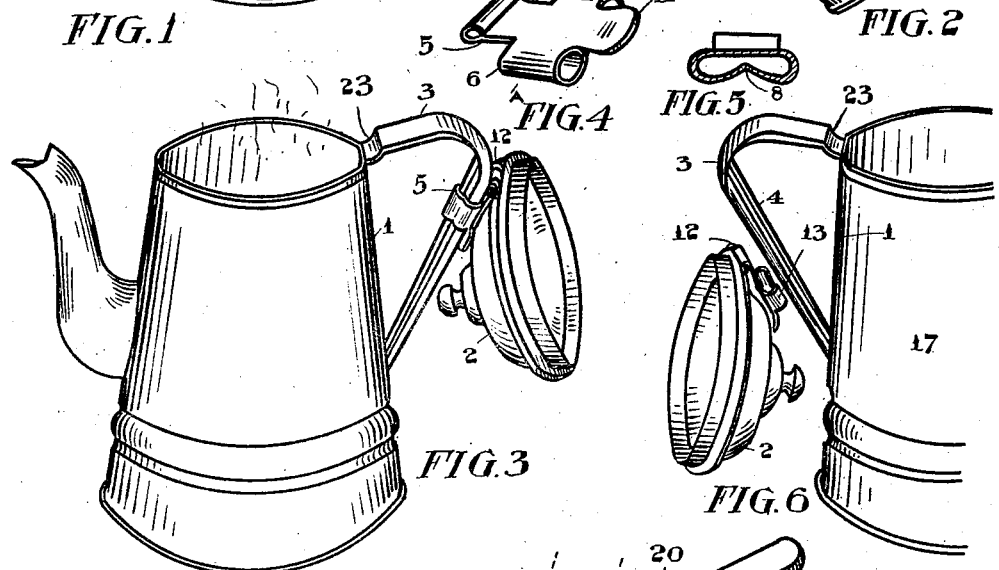
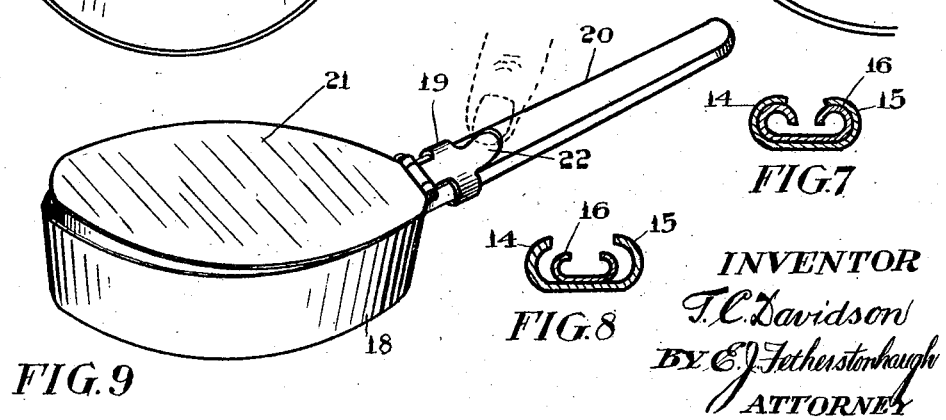
INVENTOR
T. C. Davidson
BY E. J. Featherstonhaugh
ATTORNEY

UNITED STATES PATENT OFFICE.

THOMAS CHARLES DAVIDSON, OF MONTREAL, QUEBEC, CANADA.

CULINARY VESSEL.

1,418,432. Specification of Letters Patent. Patented June 6, 1922.

Application filed October 14, 1921. Serial No. 507,740.

*To all whom it may concern:*

Be it known that I, THOMAS CHARLES DAVIDSON, manufacturer, of the city and district of Montreal, in the Province of Quebec, in the Dominion of Canada, have invented certain new and useful Improvements in Culinary Vessels; and I do hereby declare that the following is a full, clear, and exact description of the same.

The invention relates to culinary vessels as described in the present specification and illustrated in the accompanying drawings that form part of the same.

The invention consists essentially of the novel features of construction pointed out broadly and specifically in the claim for novelty following a description in detail of the preferred form of the invention.

The objects of the invention are to construct a tea or coffee pot or saucepan or other lidded receptacle, so that the lid can be completely thrown out of the way and the vessel turned upside down for draining and drying purposes; to maintain the lid of the vessel in the desired position during cooking operations while pouring liquid therefrom; and generally to provide an efficient lid fastening for vessels used in cooking or for other purposes.

In the drawings Figure 1 is a perspective view of a teapot showing the adjustable lid fastening thereon with the lid in the closed position.

Figure 2 is a perspective view showing the tea pot in the pouring position with the adjustable lid fastening held to maintain the lid closed.

Figure 3 is a perspective view showing the teapot with the lid thrown back on the handle, so that the teapot may be inverted for draining and drying purposes.

Figure 4 is a perspective detail of the sliding member of the hinge which is adjustable on the handle of the vessel.

Figure 5 is a cross sectional view of the sliding hinge member on the line A—A in Figure 4.

Figure 6 is a perspective view of a vessel showing a modified form of sliding hinge member.

Figure 7 is a cross sectional view of the hinge member illustrated in Figure 6 gripping the handle.

Figure 8 is a cross sectional view of the hinge member illustrated in Figures 6 and 7, in position for release.

Figure 9 is a perspective view of a saucepan showing the lid opened slightly by the pressure on the sliding hinge part.

Like numerals of reference indicate corresponding parts in the various figures.

Referring to the drawings the vessel 1 represents a tea or coffee pot closed by the lid 2 which is connected to the handle 3 the latter being of usual grip type secured to the pot at the top and bottom and at the top slightly recessed at 23, this handle being preferably constructed with the incurled inner edges 4 though not necessarily so, however in granite or enamel ware, the usual construction is to turn the edges of the metal in and this forms a very good hold for the sliding hinge member in this invention.

The sliding hinge member 5 extends transversely to form the inturned gripping portions 6 and 7 around the handle 3 and forwardly at 9, terminating in the barrel 10 and rearwardly forming the upturned lug or thumb piece 11. The barrel 10 encircles the wire loop 12 which is rigidly secured to the lid 2 at both ends above the recess 23 thereby making a secure yet adjustable fastening for the lid on the pot.

In Figures 1 to 5 the hinge member 5 is shown as closed around the handle 3, but in Figures 6, 7 and 8, the sliding hinge piece 13 is not closed but is formed with the two inturned gripping edges 14 and 15 engaging the handle 16 of the vessel 17, the said handle 16 tapering to form the narrow portion 13 which will pass through the opening between the inturned ends 14 and 15, thereby providing a removable sliding hinge piece and lid, otherwise the construction is the same as already described.

In Figure 9 the sliding hinge is shown as fitted to a saucepan 18 and in this the sliding hinge piece 19 is to all intents and purposes the same as those already described, and is fitted to a squared handle 20 from which it may be removed entirely by slipping over the end of the handle.

The lid 21 in this case is flat and may be brought to a slightly open position by pressing on the thumb piece 22 of the sliding hinge for the draining of water from vegetables and other food products.

To remove the lid of the vessel, such as a teapot, the sliding hinge piece is moved along the handle until it reaches the downward bend, then the pot is upset for draining and drying purposes.

To return it, the sliding hinge piece is moved along the handle, until the wire loop reaches the handle recess 23 when the lid may be set in place in the top of the pot.

In order to maintain the lid closed while pouring, the thumb is inserted behind the thumb piece 11, and by exerting slight pressure the flange of the lid is moved against the wall of the teapot and this keeps the lid from opening while pouring, which is a very useful thing in itself, though only a minor advantage in this invention.

In removing the sliding hinge member and the lid from the handle, the sliding hinge is made as illustrated in Figures 6 and 8 and is moved from the wider portion of a tapering handle to the narrow portion from which it is taken away.

The saucepan form of the invention has already been described and it may here be said that the slight differences here pointed out do not alter the salient features of the invention. Other minor changes which may be necessary from time to time in applying the invention to different types of vessels used for household and cooking purposes will not affect the main object, that is to say, the lid removable from its closure position together with its hinge fastening.

What I claim is:

In a culinary vessel, a pot having a handle tapering from its upper end downwardly, a lid for said pot, a hinge member permanently secured to said lid and rigid therewith, and a hinge member embracing said handle and having an opening for the passing of the narrow portion of said handle in removing it from its locked position on the upper portion of the handle in the closed position of the lid.

Signed at Montreal, Canada this 5th day of October, 1921.

THOMAS CHARLES DAVIDSON.